United States Patent
Hakkarainen et al.

(10) Patent No.: US 7,924,827 B2
(45) Date of Patent: *Apr. 12, 2011

(54) BOOLEAN PROTOCOL FILTERING

(75) Inventors: Tomi Hakkarainen, Nokia (FI); Pasi Kärkäs, Espoo (FI); Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 1464 days.

This patent is subject to a terminal disclaimer.

(21) Appl. No.: 10/818,542

(22) Filed: Apr. 5, 2004

(65) Prior Publication Data
US 2004/0190513 A1    Sep. 30, 2004

Related U.S. Application Data

(63) Continuation of application No. 10/083,795, filed on Feb. 27, 2002, now Pat. No. 6,728,241.

(51) Int. Cl.
*H04L 12/28* (2006.01)
(52) U.S. Cl. .......... 370/389; 370/474; 370/487
(58) Field of Classification Search .......... 370/206, 370/321, 323, 316, 389, 395.31, 466, 432, 370/537, 535, 522, 486, 487, 490, 476, 474, 370/394, 312; 386/94, 95, 201; 725/97, 725/62, 86, 131, 139, 68, 81, 34; 375/240
See application file for complete search history.

(56) References Cited

U.S. PATENT DOCUMENTS

| | | | |
|---|---|---|---|
| 5,224,152 A | 6/1993 | Harte | |
| 5,568,513 A | 10/1996 | Croft | |
| 5,613,235 A | 3/1997 | Kivari | |
| 5,951,651 A | 9/1999 | Lakshman et al. | |
| 6,041,058 A * | 3/2000 | Flanders et al. | 370/401 |
| 6,175,577 B1 * | 1/2001 | Van Den Heuvel | 370/537 |
| 6,212,184 B1 * | 4/2001 | Venkatachary et al. | 370/392 |
| 6,229,801 B1 * | 5/2001 | Anderson et al. | 370/349 |
| 6,314,111 B1 | 11/2001 | Nandikonda | |
| 6,430,183 B1 * | 8/2002 | Satran et al. | 370/389 |
| 6,628,891 B1 * | 9/2003 | Vantalon et al. | 386/94 |
| 6,650,710 B1 * | 11/2003 | Hamery et al. | 375/240.29 |
| 6,804,259 B1 * | 10/2004 | Onagawa | 370/476 |
| 7,512,084 B2 * | 3/2009 | Jalonen | 370/312 |

(Continued)

FOREIGN PATENT DOCUMENTS

EP    1067769    1/2001

(Continued)

OTHER PUBLICATIONS

Digital Video Broadcasting (DVB); Interaction Channel through the Global System for Mobile Communications, European Telecommunications Standard Institute, ETSI EN 301 195 V1.1.1, 1999.

(Continued)

*Primary Examiner* — Aung S Moe
*Assistant Examiner* — Vinncelas Louis
(74) *Attorney, Agent, or Firm* — Banner & Witcoff, Ltd

(57) ABSTRACT

The present invention provides methods and apparatus for filtering a broadcast data stream that can support data flow, e.g. IPv6 packets. The present invention utilizes common filtering for packet segments that are common among IPv6 packets. Segments that are not common are separately filtered. A set of rules is applied to the filtered segments in order to determine whether corresponding packets should be subsequently processed. The present invention is applicable to numerous application including MPEG multicast services.

8 Claims, 8 Drawing Sheets

U.S. PATENT DOCUMENTS

| | | | |
|---|---|---|---|
| 2001/0026561 A1 | 10/2001 | Morris | |
| 2002/0087999 A1* | 7/2002 | Kashima | 725/100 |
| 2002/0136218 A1* | 9/2002 | Cardoso, Jr. | 370/394 |
| 2002/0150094 A1* | 10/2002 | Cheng et al. | 370/389 |
| 2003/0012190 A1 | 1/2003 | Kaku | |
| 2003/0135636 A1 | 7/2003 | Walsh | |
| 2005/0120378 A1* | 6/2005 | Jalonen | 725/97 |

FOREIGN PATENT DOCUMENTS

| | | |
|---|---|---|
| WO | WO 00/36861 | 6/2000 |

OTHER PUBLICATIONS

Digital Video Broadcasting (DVB); DVB Specification for Data Broadcasting, European Telecommunications Standard Institute, ETSI EN 301 192 V1.2.1, 1999.

"Digital Video Broadcasting (DVB); Specification for Service Information (SI) in DVB Systems," European Telecommunications Standard Institute, ETSI EN 300 468 v1.4.1, 2000.

Salkintzis, A.K. et al., "*An In-Band Power-Saving Protocol for Mobile Data Networks*," IEEE Transactions on Communications, vol. 46, No. 9, Sep. 1998, pp. 1194-1205.

Salkintzis, A.K. et al., "*Performance Analysis of a Downlink MAC Protocol with Power-Saving Support*," IEEE Transactions on Communications, vol. 49, No. 3, May 2002, pp. 1029-1040.

Little, T.D.C. et al., "Prospects for Interactive Video-on-Demand," IEEE Multimedia, Fall 1994, pp. 1-22, vol. 1, No. 3, National Science Foundation.

\* cited by examiner

BOOLEAN PROTOCOL FILTERING

This application is a continuation of common-owned, co-pending U.S. application Ser. No. 10/083,795 filed on Feb. 27, 2002, naming Tomi Hakkarainen, Pasi Karkas, and Harri Pekonen as inventors, the entire disclosure of which is hereby incorporated by reference.

FIELD OF THE INVENTION

The present invention relates to data filtering. In particular, the invention relates to apparatus and methods for filtering data packets of data for multiple data connections.

BACKGROUND OF THE INVENTION

With the evolution of communication services, digital services are requiring greater transmission bandwidth. Moreover, more subscribers are subscribing to these services, thus exacerbating the bandwidth demands to an even greater degree. Consequently, services that are common to a group of users and are unidirectional in nature can be broadcasted to the group of users. This approach is commonly referred as multicast services. One example of such a service is digital video broadcast (DVB) in which video signals (such as television) are broadcasted over different transport media, including terrestrial facilities (DVB-T), satellite facilities (DVB-S), and cable facilities (DVB-C). A plurality of services are typically transmitted over a common data stream.

Digital data is typically transported from one location to another in packets having well-defined segments. FIG. 1, for example, illustrates a MultiProtocol Encapsulation (MPE) packet 100 using a DSM-CC section format (also referred as a DSM-CC Private section) that may be used to transport audio, video or other data. Packet 100 includes several distinct segments that are defined by a protocol. For example, the MAC address is formed from different segments of packet 100.

Components that are configured to filter packets read information found in the different segments within the packet. For example, a digital video broadcast (DVB) receiver may read the information found in table id segment section 102, MAC address 1 segment 104, MAC address 2 segment 106 and MAC address 5 segment 108. Conventional hardware based filters are configured to read contiguous segments of data. When the desired data is found in clusters and is not contiguous, resources are wasted when excessively large filters are utilized to filter the clusters of data. Cluster is a generic term and may include a contiguous segment or a set of contiguous data within a packet or a segment of a packet. With respect to packet 100, table id 102 and MAC address segment 5 108 are found in non-contiguous segments or clusters. When a single filter is utilized to filter bits 0-40, the desired clusters are filtered along with several bits of unneeded data. As a result, the size of the filter is unnecessarily large. Supporting a plurality of data connections exacerbates the size of the filter configuration.

In order to provide DVB services, the associated MPEG-2 (Motion Picture Expert Group) transport stream (TS) that is received over the DVB RF channel contains a data signal having a large bandwidth, thus requiring substantial processing whether by associated hardware or by software being executed by a processor. The MPEG-2 stream broadcasts different services to different groups of users by multiplexing streams of different programs. In the art, the broadcasting arrangement is commonly referred as multicasting. There are many fields (segments) in the MPEG-2, MPE (Multiprotocol Encapsulation) and IP protocol headers that must be processed by the receiver's protocol filter. FIG. 2 shows processing a DVB transport stream according to prior art. A MPEG transport stream 225 carries DVB services and comprises a plurality of packets of different packet types as differentiated by a packet identifier (PID). A PID filter 201 compares each packet with a preselected PID and passes only packets containing the preselected PID in a transport stream 227. Consequently, a processor 205 processes all packets having the preselected PID. If processor 205 processes the data stream with software, the associated processor clock must be sufficiently high. However, increasing the clock speed increases the power consumption of the processor that executes the software. Especially with mobile terminals, power consumption is an important engineering consideration in view of the size of the terminal's battery. Processing the data stream with hardware also has engineering issues. Processing the large number of fields with a stream having a large bandwidth increases the required amount of logic circuitry. However, a circuit consumes more power as the size increases with circuit complexity.

New services such as DVB require high-bandwidth transport streams such MPEG-2 and MPEG-4. Consequently, the demands on a receiver in processing the transport streams are increasing. A method and apparatus that reduces the associated processing are beneficial in advancing the art in support of these services.

BRIEF SUMMARY OF THE INVENTION

An aspect of the present invention provides methods and apparatus for filtering a broadcast data stream that can support a plurality of data connections. The aspect of the present invention utilizes common filtering for packet segments that are common among the plurality of data connections. Segments that are not common are separately filtered. A set of logic rules is applied to the filtered segments in order to determine whether corresponding packets should be subsequently processed.

In an exemplary embodiment of the invention, a digital video broadcast (DVB) receiver that detects a plurality of IPv4 connections in accordance with a set of predetermined conditions that are applied to selected packet segments of a MPEG-2 (Motion Picture Expert Group) transport stream is provided. (However, the present invention can support protocols other than IPv4.) All selected packets are inputted to a processor for subsequent processing. The selection of the packets is performed by a programmable filter arrangement that utilizes common filtering and Boolean logic. A variation of the exemplary embodiment detects a plurality of IPv6 connections.

Another exemplary embodiment comprises a programmable filter arrangement in which Boolean logic functionality is applied to service information table connections. A service information packet is passed for subsequent processing only if the service information packet has been updated since the last occurrence of processing the packet by a processor.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 3:
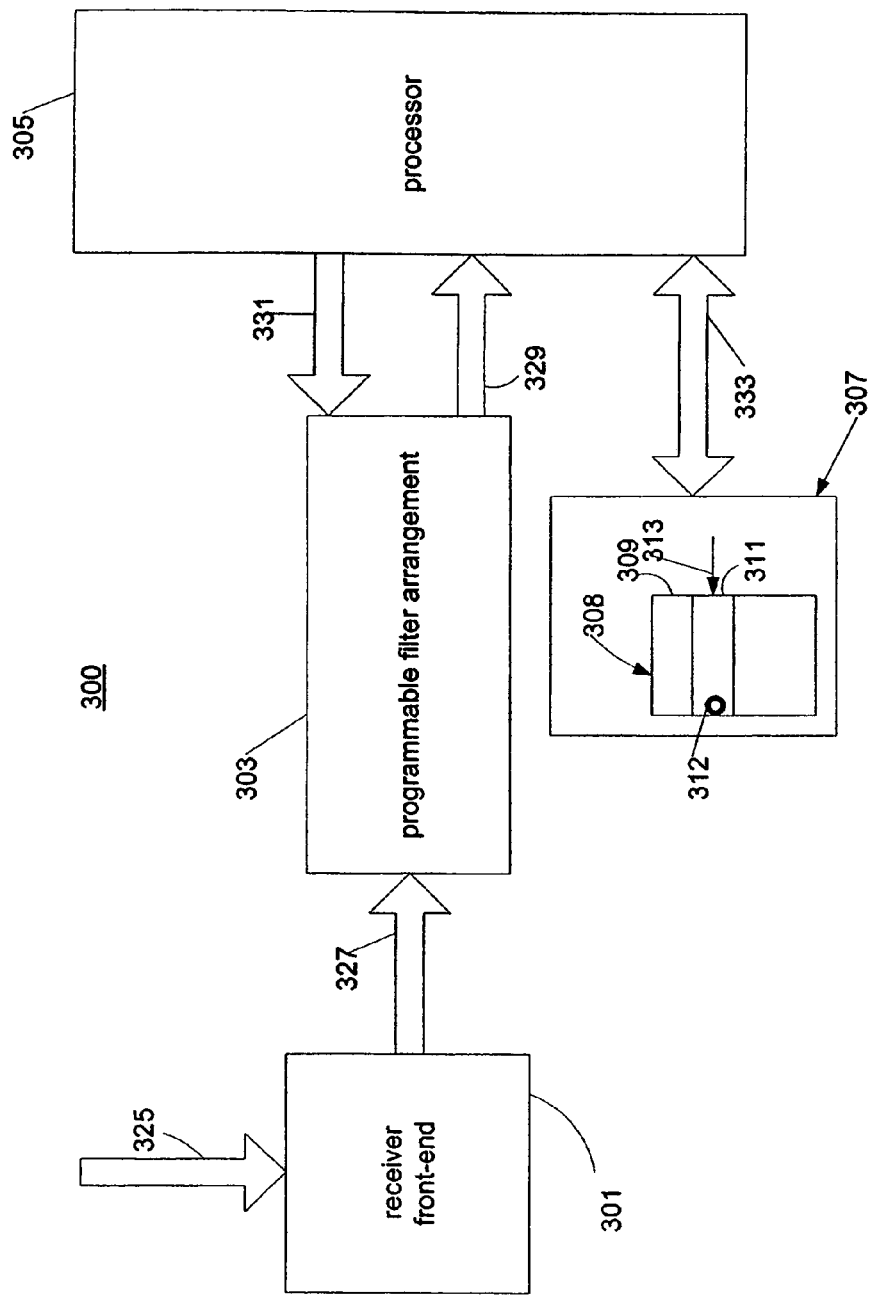
FIG. 3 shows a receiver in accordance with an embodiment of the present invention.

FIG. 3 shows a digital video broadcast (DVB) receiver 300 in accordance with an embodiment of the present invention. In the exemplary embodiment, receiver 300 comprises a receiver front-end 301, a programmable filter 303, a user interface 307, and a processor 305. Receiver front-end 301 receives a signal 325 that may contain a MPEG transport stream. Receiver front-end 301 may be configured to extract the MPEG transport stream and transmit a MPEG transport stream 327 to a programmable filter arrangement 303. The present invention supports services, including broadcast services (i.e. one to all), multicast services (i.e. one to many, and unicast services (i.e. one to one). MPEG transport stream 327 may contain packets that correspond to different services and that are distinguished by a predetermined combination of segments (fields). Receiver front-end 301 converts signal 325 into a baseband format, such that MPEG transport stream 327 can be filtered by programmable filter 303 in order to determine whether the predetermined combination of segments in transport stream 327 is indicative of a desired service within transport stream 327. As an example, transport stream 327 can contain a plurality of video programs (e.g. business news on CNN and mystery movies on HBO). Programmable filter arrangement 303 determines if each relevant segment is equal to a predetermined value. If so, a Boolean value corresponding to the filtered segment is "true" or "1." If not, the Boolean value is "false" or "0." Boolean logic is consequently applied to the corresponding Boolean values in order to process the desired program in transport stream 327. However, variations of the exemplary embodiment can utilize alternative approaches to logic such as a set of logic rules or predicate calculus.

Selected packets may be inputted to a processor 305 for further processing through a port 329. Processor 305 configures programmable filter arrangement 303 through a port 331 in order that filter arrangement 303 filters the relevant segments of the TS packets in accordance with the selected service. Operation of programmable filter arrangement 303 is discussed in more detail in conjunction with FIGS. 4, 5, 6, and 7.

A user interface 307 interfaces to processor 305 through a bi-directional port 333. User interface 307 enables the user of receiver 300 to configure receiver 300 to select services from a plurality of services carried by signal 325. User interface 307 may include a display 308 that can be utilized to display a subset of available services for the user as illustrated as an entry 309 and an entry 311. The entries may appear to the user in alphanumeric format to facilitate viewing. The user subsequently manipulates a cursor 313 in order to select entry 311. The service selection is inputted to processor 305 through port 333. Processor 305 processes the corresponding alphanumeric information in order to determine the corresponding filter values. The filter values are subsequently outputted to programmable filter arrangement 303 through port 331. An indicator 312 is activated when programmable filter arrangement 303 has been configured to filter the selected service in order to notify the user of the service configuration.

Figure 4:
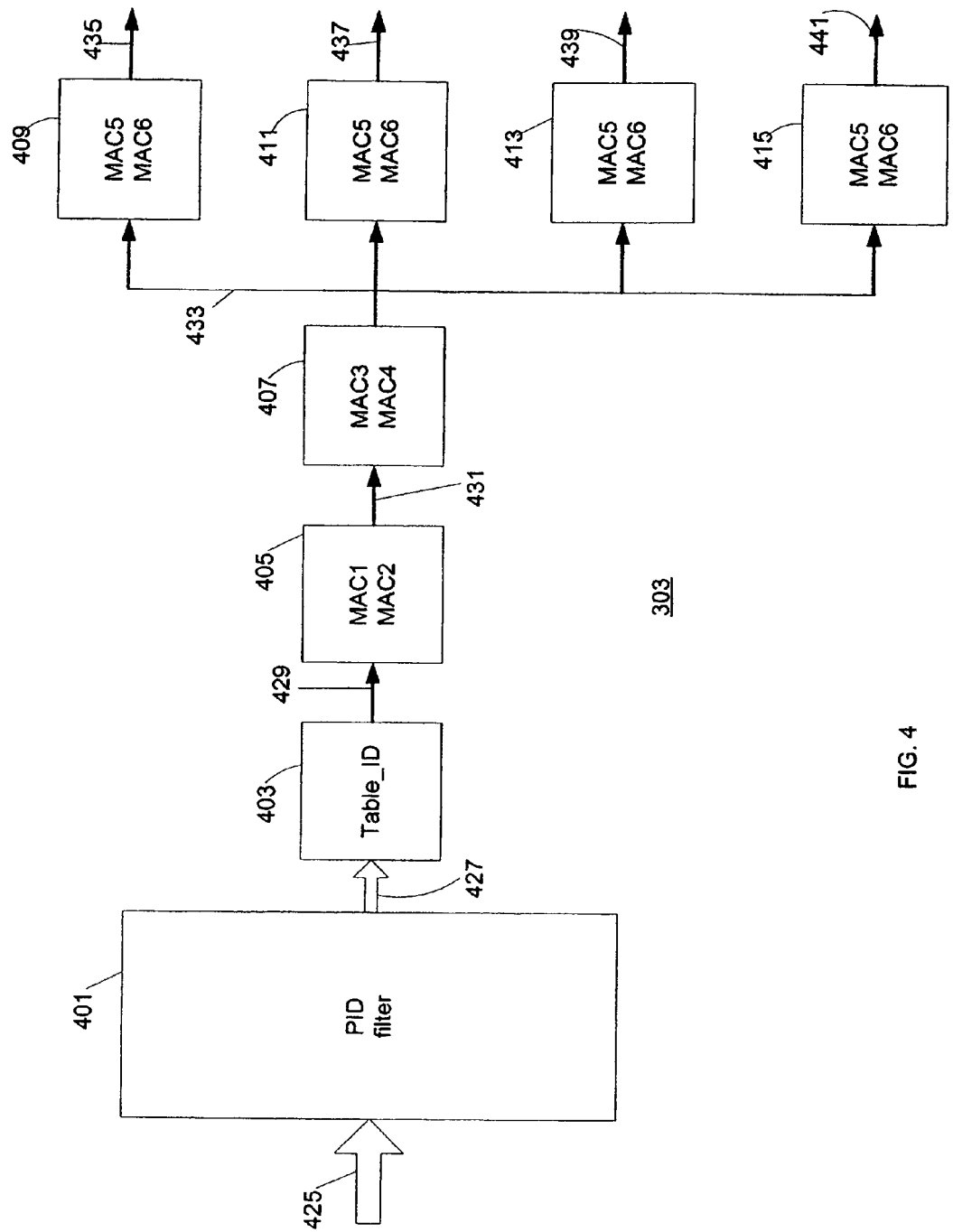
FIG. 4 shows an architectural configuration for a programmable filter arrangement in which Boolean logic functionality combines MPE data connections in accordance with an embodiment of the present invention.

FIG. 4 shows an architectural configuration for programmable filter arrangement 303 in which Boolean logic functionality combines MPE data connections in accordance with an embodiment of the present invention. The programmable filter arrangement (corresponding to filter arrangement 303 in FIG. 3) comprises a packet identification (PID) filter 401, a Table_ID segment filter 403, a MAC1, MAC2 segments filter 405, a MAC3, MAC4 segments filter 407, and MAC5, MAC6 segments filters 409, 411, 413, and 415.

A MPEG transport stream 425 can multiplex a plurality of services. Each service corresponds to a plurality of TS packets that are distinguishable by different segment values. Each filter (e.g. filter 405) is configured to span MPEG transport stream 425 across a specified segment and to determine if the corresponding value is equal to a predetermined value. If so, the corresponding TS packet passes through filters 401, 403, 405, 407, 409, 411, 413, and 415 to be further processed by a subsequent processing element, which may be a cascaded filter or a processor. (An MPE packet can be transported in a plurality of TS packets. In that case, as supported by the present invention, MAC1, MAC2, MAC3, MAC4, MAC5, and MAC6 segments may not be transported in the same TS packet.)

In FIG. 4, MPEG transport stream 425 is processed by PID filter 401. Filter 401 passes a data stream 427 that contains only packets having a specified value. (The packet can be an MPE/DSM-CC section packet that is carrying IP inside its payload area or a pure IPv4/IPv6 packet.) Subsequent processing by filters 403, 405, and 407 determines if the input data stream (corresponding to data streams 429, 431, and 433 respectively) has corresponding segments with predetermined values. If so, the data stream is passed for further processing. In the exemplary embodiment, packets passed in a data stream 433 satisfy the Boolean relationship:

$$(PID==w) \text{ AND } (Table\_ID==x) \text{ AND } (MAC1, MAC2==y) \text{ AND } (MAC3, MAC4==z) \quad (EQ. 1)$$

where w, x, y, and z are predetermined values. ("p==q" is a Boolean term that is "1" or "true" only if p is equal to q; otherwise the term is "0" or "false.") Thus, the "AND" Boolean operation is correspondingly implicit among filters 403, 405, and 407.

Filters 409, 411, 413, and 415 separately filter data stream 433 according to MAC5 and MAC6 segments 108 and 110. The predetermined values that are utilized by each of filters 409, 411, 413, and 415 are different, thus distinguishing the corresponding value of the MAC5 and MAC6 segments. If an MPE packet contains MAC5 and MAC6 segments equal to predetermined values, filters 409, 411, 413, and 415 pass the packet through on data connections 435, 437, 439, and 441, respectively in order to be further processed by processor 305 through data port 329 as shown in FIG. 3.

Data connections 435, 437, 439, and 441 collectively comprise data port 329. Each data connection may correspond to a separate physical input or may be multiplexed on the same physical input. If "R" represents the Boolean value of EQ. 1, then the corresponding Boolean function for the programmable filter arrangement shown in FIG. 4 is:

$$R \text{ AND } ((MAC5,MAC6==a) \text{ OR } (MAC5,MAC6==b) \text{ OR } (MAC5,MAC6==c) \text{ OR } (MAC5,MAC6==d)) \quad \text{EQ. 2}$$

Figure 5:
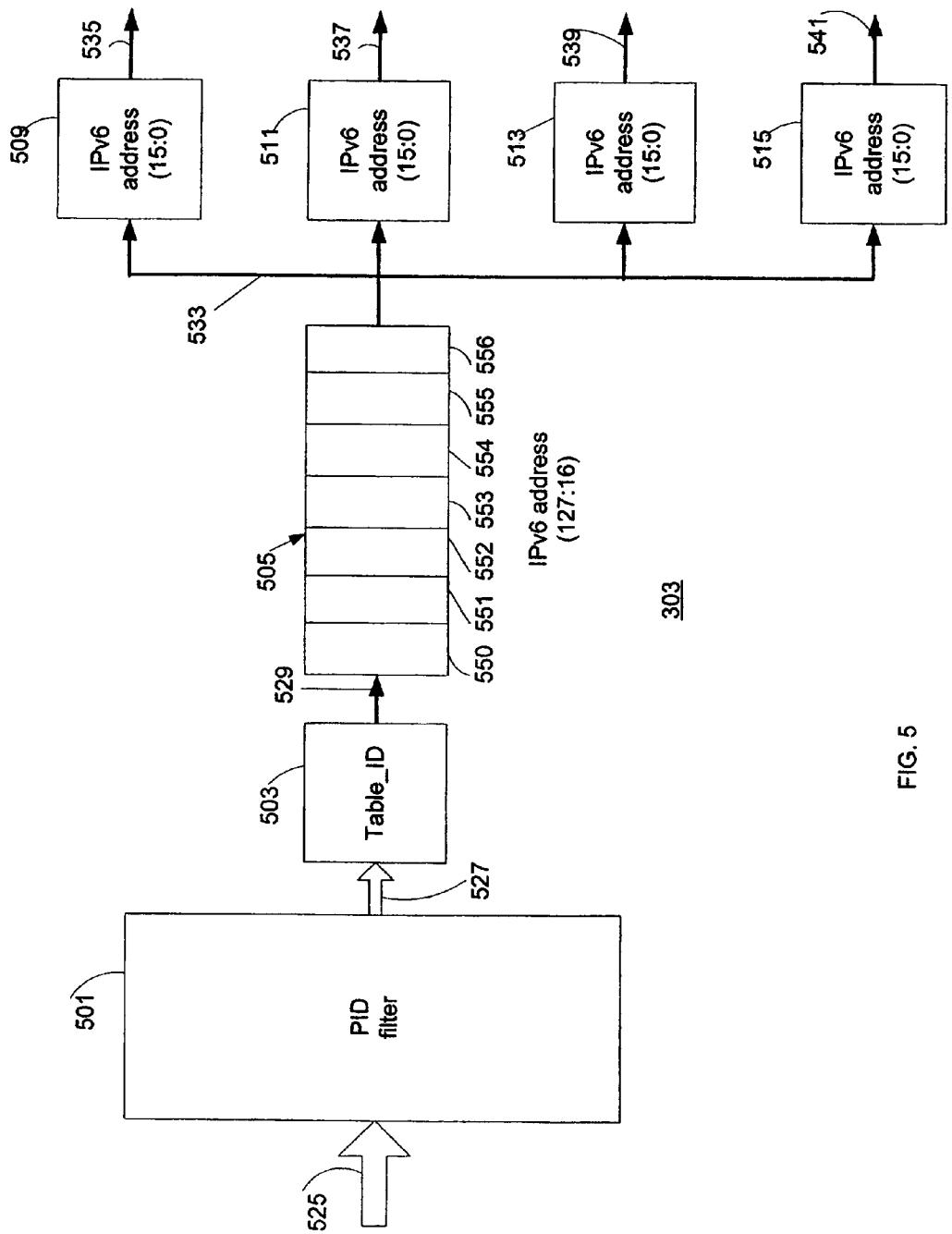
FIG. 5 shows an architectural configuration for a programmable filter arrangement in which Boolean logic functionality combines IPv6 data connections in accordance with an embodiment of the present invention.

FIG. 5 shows an architectural configuration for programmable filter arrangement 303 in which Boolean logic functionality combines IPv6 (Internet protocol version 6) data flow in accordance with a variation of the exemplary embodiment of the present invention. IPv6 supports a larger address field (128 bits) with respect to IPv4 (32 bits). Consequently, processing IPv6 data flow may require substantially more processing resources. Common filtering of common segments can substantially reduce the increase of processing resources.

In the variation of the exemplary embodiment, programmable filter arrangement 303 comprises a PID filter 501, a Table_ID segment filter 503, a high address filter 505, and low address filters 509, 511, 513, and 515. A MPEG transport stream 525 is processed by PID filter 501. Filter 501 passes a data stream 527 that contains only packets having a specified value of the PID. Filter 503 passes packets having Table_ID segments that are equal to a predetermined value in a data stream 529. High address filter 505 passes packets having an IP address ($127^{th}$ bit through $16^{th}$ bit and comprising address components 550, 551, 552, 553, 554, 555, and 556 and corresponding to 16 address bits) equal to a predetermined value through a data stream 533. Low address filters 509, 511, 513, and 515 process packets in data stream 533 in order to pass only packets having a low IP address ($15^{th}$ bit through $0^{th}$ bit) with a predetermined value. The passed packets are sent to processor 305 for further processing on data connections 535, 537, 539, and 541. The corresponding Boolean function for the programmable filter arrangement in FIG. 5 is:

$$(PID=w) \text{ AND } (Table\_ID=x) \text{ AND } (high\ address=y) \text{ AND } ((low\ address=a) \text{ OR } (low\ address=b) \text{ OR } (low\ address=c) \text{ OR } (low\ address=d)) \quad (EQ. 3)$$

where w, x, y, a, b, c, and d are predetermined values.

Figure 6:
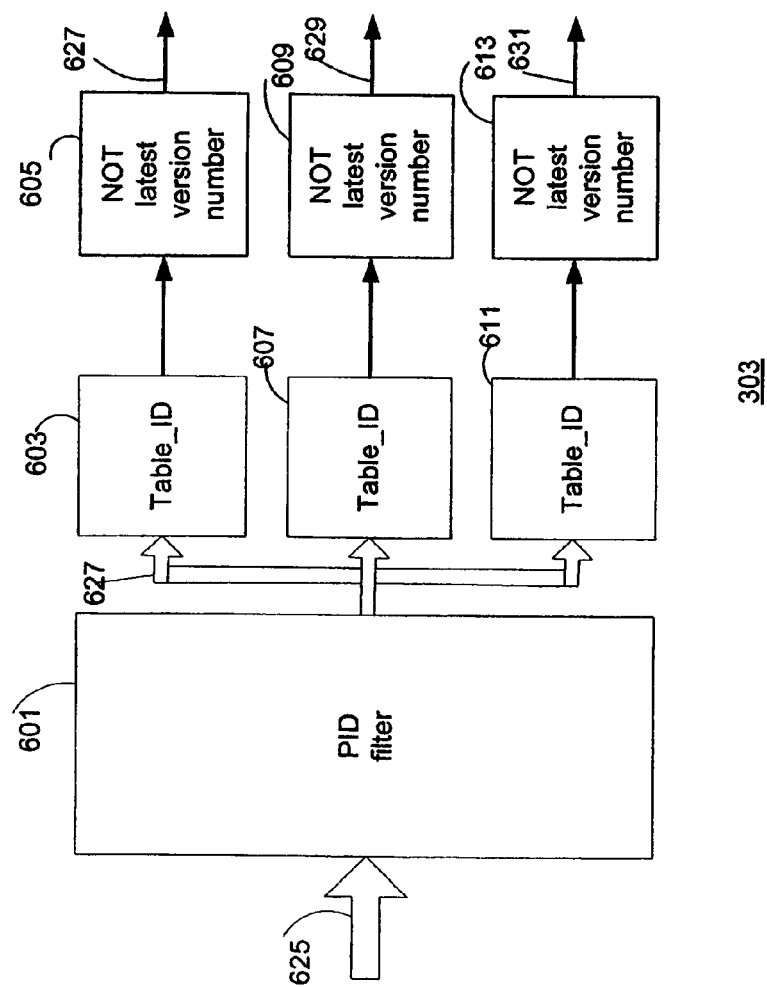
FIG. 6 shows an architectural configuration for a programmable filter arrangement in which Boolean logic functionality combines service information table connections in accordance with an embodiment of the present invention.

FIG. 6 shows an architectural configuration for a programmable filter arrangement in which Boolean logic functionality combines service information table connections and another exemplary embodiment of the present invention. Programmable filter arrangement 303 comprises filters 601, 603, 605, 607, 609, 611, and 613 and passes service information packets to processor 305 for further processing. A MPEG transport stream 625 is processed by a PID filter 601. Filter 601 passes a data stream 627 that contains only packets having a specified PID value. Filters 603, 607, and 611 pass packets that are service information packets. (The packets may be MPE/DSM-CC section packets that carry IP inside its payload area or may be pure IPv4/IPv6 packets if protocol headers are removed by the filter.) If the service information packet is updated since the last occurrence of processing the service information packet by processor 305, the packet is passed on data connections 627, 629, and 631 in order that processor 305 can further process the packet. The corresponding Boolean function of the programmable filter arrangement in FIG. 6 is:

$$(PID==w) \text{ AND } (((Table\_ID==x) \text{ AND NOT (latest version number==a)}) \text{ OR } ((Table\_ID==y) \text{ AND NOT (latest version number==b)}) \text{ OR } ((Table\_ID==z) \text{ AND NOT (latest version number==c)})) \quad (EQ. 4)$$

Figure 1:
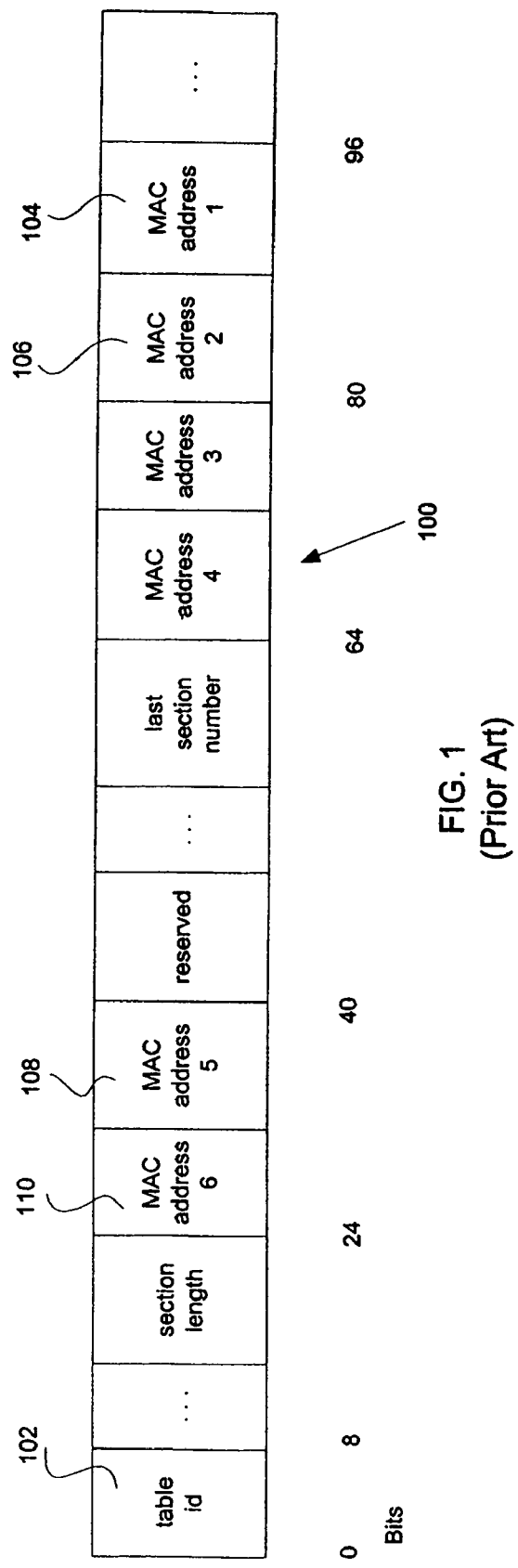
FIG. 1 shows a conventional digital video broadcast (DVB) MultiProtocol Encapsulation (MPE) packet using a DSM-CC section format (also referenced as a DSM-CC Private section)
Figure 2:
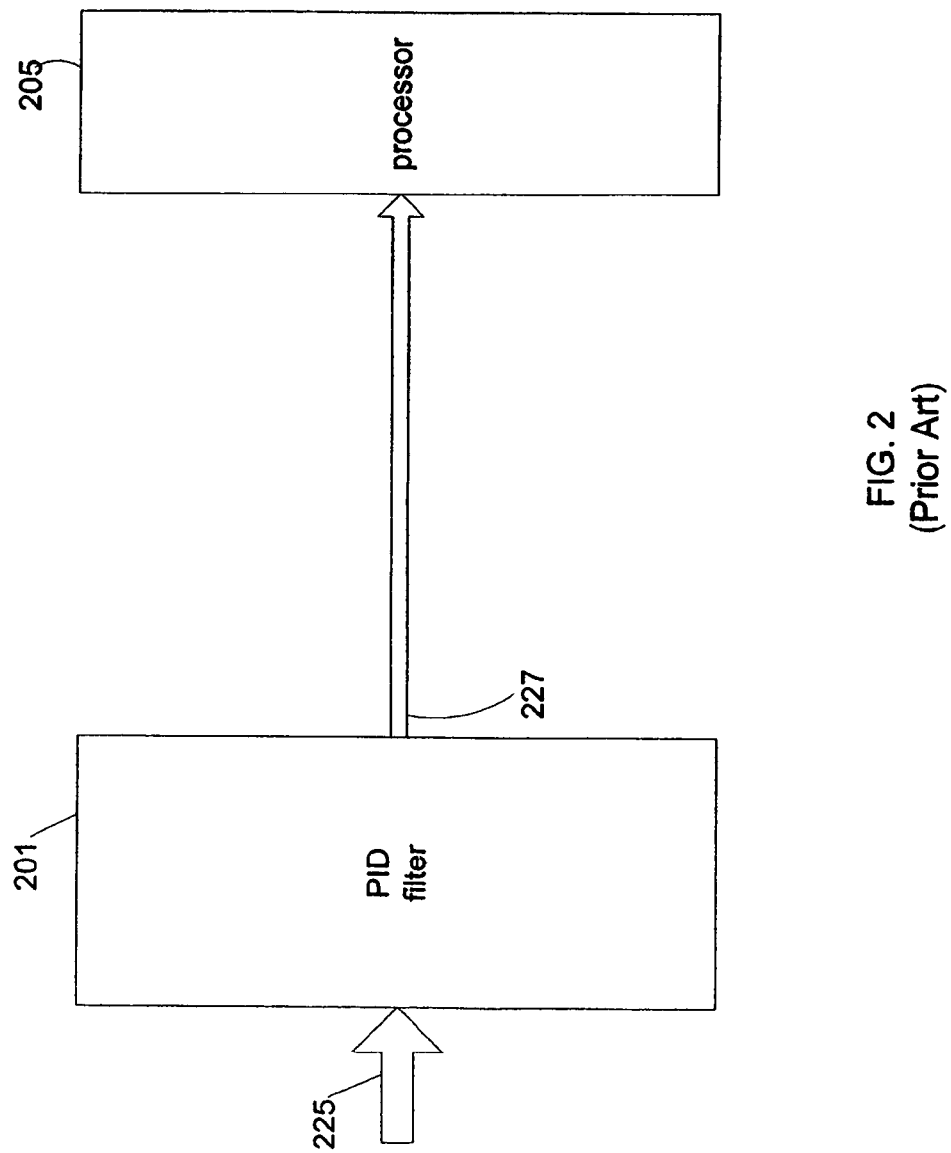
FIG. 2 shows processing a DVB transport stream according to prior art.
Figure 7:
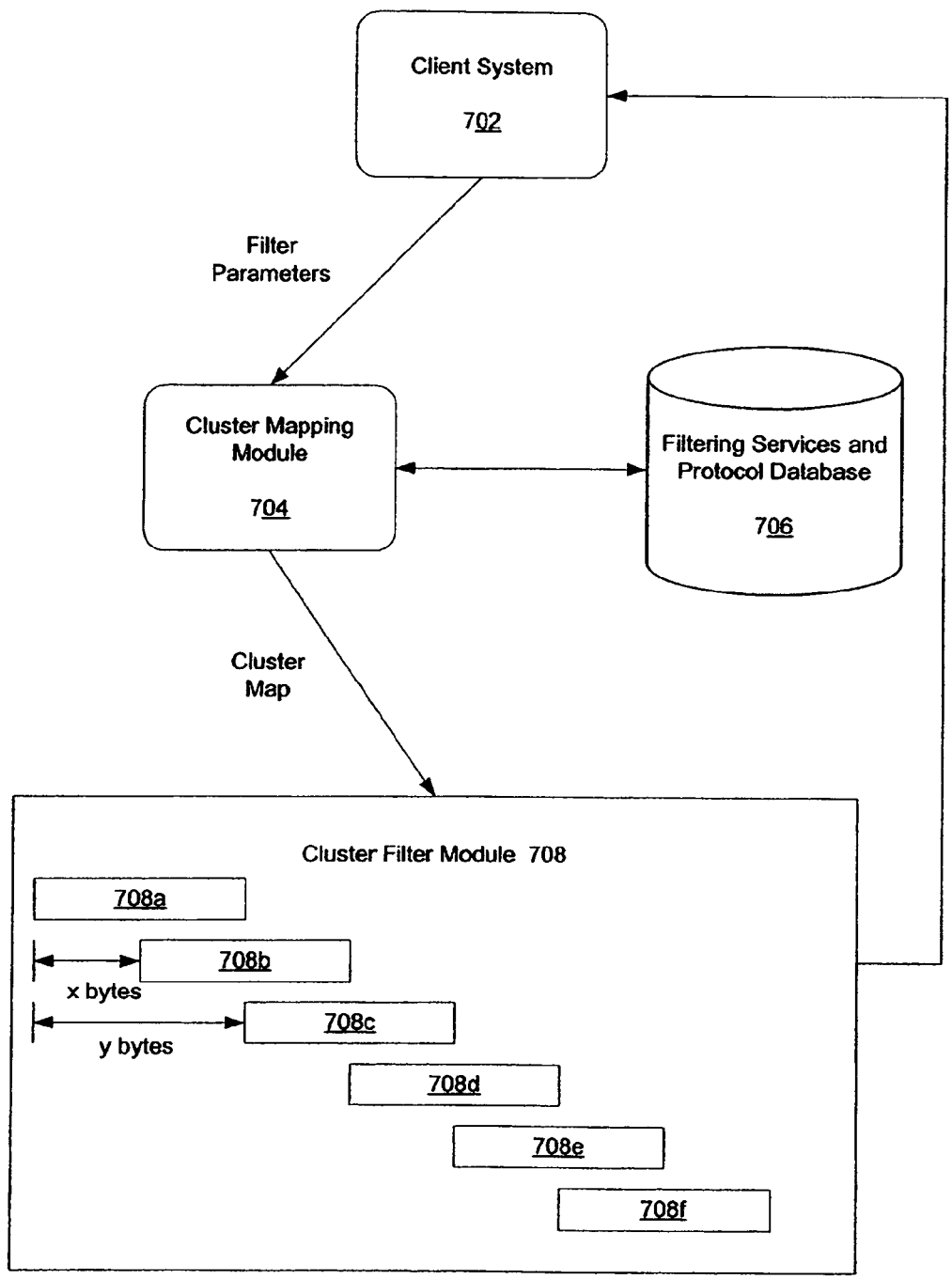
FIG. 7 illustrates a system for filtering clusters of data found in packets, in accordance with an embodiment of the invention.

Programmable filter arrangement 303 may utilize an architecture for cluster filtering as disclosed in a co-pending application entitled "Cluster Filtering" (Hakkarainen, et al.) and filed Dec. 20, 2001. FIG. 7 illustrates a system for filtering clusters of data found in packets, in accordance with an embodiment of the invention. As used herein, the term "packet" encompasses any digital data formatted in a protocol having discrete segments. Moreover, a packet may include data formatted in a first protocol that has been encapsulated or framed according to one or more additional protocols, for example Internet protocol (IP) packets encapsulated for transmission across a DVB network. A client system 702 (e.g. processor 305) transmits filter parameters to a cluster mapping module 704 that may be a component of programmable filter arrangement 303. Client system 702 may be implemented with software and/or hardware components that include: a DVB receiver, user interface, mobile terminal, or any other hardware or software component that processes clusters of data found in digital packets. The filter parameters may include the identification of clusters of data located in segments of packets having a known protocol. For example, client system 702 may indicate that it desires to process table id 102 and MAC address sections 1-6 (shown in FIG. 1). In another example, client system 702 may indicate that it desires to filter a DVB-T interface for an IPv6 address. Cluster mapping module 704 may then create a cluster map from the filter parameters received from client system 702. The cluster map may then be transmitted to a cluster filter module 708 that may be another component of programmable filter arrangement 303.

The cluster map may include information such as a number of filters that will be utilized, the offset values of each of the filters, a filter mask and combinatory logic functions for each filter, i.e., which of the Boolean functions is used for a particular data segment when the return value ("TRUE" or "FALSE") of the overall Boolean function over the active data segments is formed for data filtering. An offset value identifies a point, from the beginning of a packet, at which a given filter will begin filtering operations. A filtering services and protocol database 706 (that may be another component of programmable filter arrangement 303) may be included to store filtering and protocol information. (Other embodiments of the invention may directly connect client system 702 to cluster mapping module 704 in order to provide filter parameters without protocol database 706.) The formats of any number of protocols and the locations of sections of data within the protocols may be stored in database 706. Cluster maps may also be stored in database 706 to reduce the processing steps performed when a filter map has previously been created for a set of filter parameters. Instead of creating a new cluster map, the previously created cluster map may be retrieved from database 706.

Cluster filter module 708 includes six two-byte filters 708a-708f. In some embodiments of the invention, multiple identical filters are utilized because of the relative ease with which multiple identical filters may be implemented in hardware. In alternative embodiments, the cluster filter module may include filters having a variety of different sizes and offset values. The sizes and offset values may be selected to correspond to predetermined applications and/or predetermined protocols by cluster mapping module 704. FIG. 7 shows that filter 708a has an offset value of 0 bytes, that filter 708b has an offset value of x bytes and that filter 708c has an offset value of y bytes. The offset values are measured from the beginning of a packet. FIG. 7 shows an embodiment in which filters 708a-708f overlap. In other embodiments, filters 708a-708f may be formed so that some or none of filters 708a-708f overlap to conserve resources.

The following examples illustrate the benefits of utilizing clustering filtering and common filtering. As a first example, consider a programmable filter arrangement that supports 13 IPv4 connections through a DVB-T wireless network. Implementing a programmable filter arrangement with 13 separate parallel channels (one channel for each IPv4 connection), one requires 728 configuration registers (configuration bits) (13*(8+48)) to process Table_ID and MAC address segments for the 13 IPv4 connections. As a comparison, one can utilize common filtering configuration as shown in FIG. 4 and a cluster filtering configuration as shown in FIG. 7.

However, in the example there are 13 MAC5, MAC6 segment filters rather than 4 segment registers as shown in FIG. 4. Using the approach as disclosed in the invention, one calculates that 640 configuration registers (configuration bits) (16*(16 bit filtering values+16-bit mask+8 bit for offset and Boolean filtering control) are needed for filtered values, corresponding to a semiconductor area savings of approximately 12%. Moreover, the true area savings is even greater because only one filtering channel logic circuit is needed rather than 13 separate logic circuits.

With a second example, consider processing 8 IPv6 connections, where each IPv6 address is 128 bits. With 8 separate IPv6 connections, one determines that 1,984 configuration registers (8*(8+7*16+8*16)) for processing Table_ID and IPv6 address information. However, using a similar configuration as shown in FIG. 5 (but with 8 low address filters rather than 4), one determines that 640 configuration registers are required for an area savings of approximately 67%. In general, with a greater component of common filtering values between received services and larger filtered segments, one obtains a greater the benefit with using common filtering and cluster filtering as disclosed in the present invention.

Figure 8:
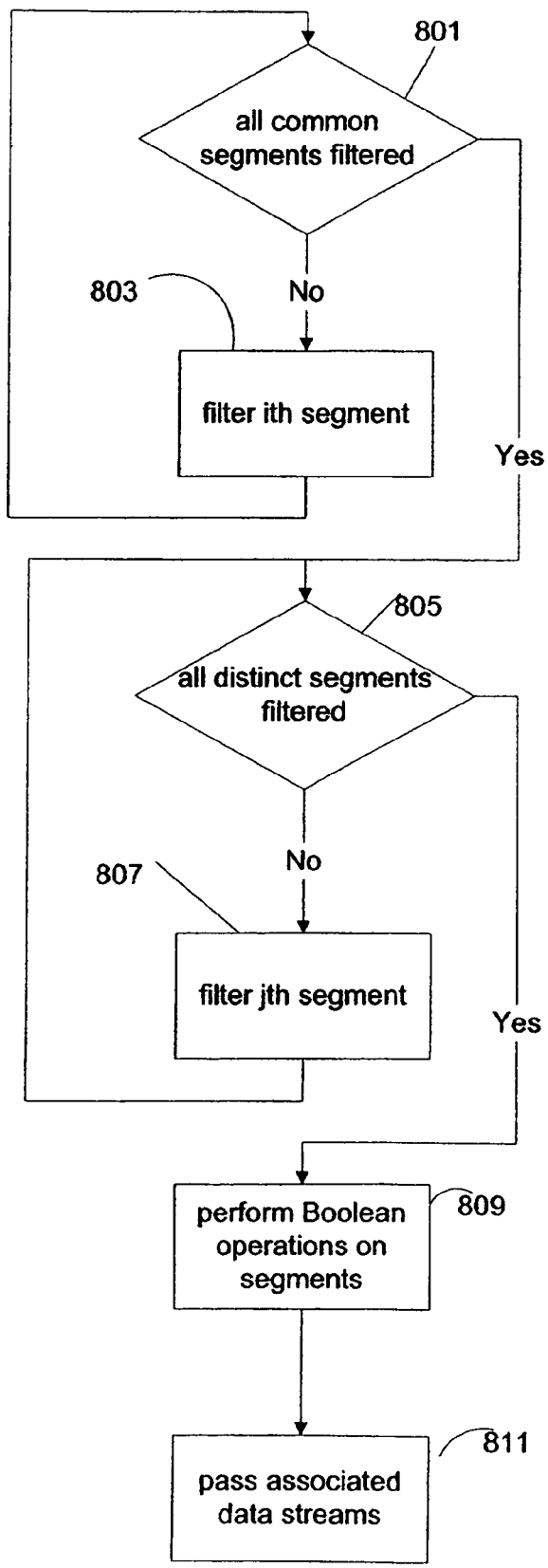
FIG. 8 shows a flow diagram in accordance with an embodiment of the present invention.

FIG. 8 shows a flow diagram in accordance with the exemplary embodiments of the present invention and is applicable with the programmable filter arrangements shown in FIGS. 4, 5, and 6. Step 801 determines if a plurality of data connections have common segments that have not been filtered. If so, step 803 is executed in order to determine if the $i^{th}$ segment has a value equal to a predetermined value to obtain a corresponding Boolean value. Once all common segments have been processed, step 805 determines if segments that are not common among the data connections have been processed. Step 807 is executed in order to determine if the $j^{th}$ segment has a value equal to a predetermined value to obtain a corresponding Boolean value. Step 809 executes the desired Boolean operations and passes the packet in step 811 if the resulting Boolean result is "true."

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   receiving a data stream comprising a first service and a second service, the first service comprising a first packet, the first packet comprising a first address segment, the first address segment corresponding to a terminating portion of a service address field, the terminating portion being a proper subset of the service address field, the second service comprising a second address segment, the second address segment corresponding to the terminating portion of the service address field;
   determining a predetermined terminating value;
   comparing the predetermined terminating value stored in a register to the first address segment to determine a first Boolean value;
   in response to said determining that the first Boolean value equals 'True', processing the first packet to support the first service;
   configuring a filter arrangement to process the first address segment by:
   (i) receiving an identification of at least two clusters comprising the first address segment of the first packet; and
   (ii) selecting at least two of a plurality of fixed length filters to filter the at least two clusters;
   comparing the predetermined terminating value stored in the register to the second address segment to determine a second Boolean value; and
   in response to said determining that the second Boolean value equals 'True', processing the second packet to support the second service.

2. The method of claim 1, further comprising:
   generating a filter mask that identifies segments of the at least two of a plurality of fixed length filters.

3. The method of claim 2, further comprising: providing filter values.

4. The method of claim 3, further comprising:
   receiving a selection of the first service; and
   determining the filter values corresponding to the first service.

5. The method of claim 1, wherein an address format of the service address field is selected from the group consisting from an IP version 4 address and an IP version 6 address.

6. An apparatus comprising:
   a filter arrangement configured to compare a predetermined segment value with a first segment of a first packet, the first packet contained in a first service, wherein the filter arrangement comprises:
   a mapping module configured to obtain an identification of at least two clusters and configured to select at least two of a plurality of fixed length filters to filter the at least two clusters, wherein the at least two clusters comprise a first address segment of the first packet;
   a filter module comprising the plurality of fixed length filters that filters the at least two clusters; and
   a processor that configures the filter arrangement, wherein the processor is configured to:
   receive a data stream comprising the first service and a second service, the first address segment corresponding to a terminating portion of a service address field, the terminating portion being a proper subset of the service address field, the second service comprising a second address segment, the second address segment corresponding to the terminating portion of the service address field;

determine a predetermined terminating value;

compare the predetermined terminating value stored in a register to the first address segment to determine a first Boolean value;

responsive to said determining that the first Boolean value equals 'True', process the first packet to support the first service;

compare the predetermined terminating value stored in the register to the second address segment to determine a second Boolean value; and responsive to said determining that the second Boolean value equals 'True', process the second packet to support the second service.

7. The apparatus of claim 6, wherein the filter arrangement comprises integrated circuits.

8. A non-transitory computer-readable medium storing computer-executable instructions that, when executed by an apparatus, cause the apparatus to:

receive a data stream comprising a first service and a second service, the first service comprising a first packet, the first packet comprising a first address segment, the first address segment corresponding to a terminating portion of a service address field, the terminating portion being a proper subset of the service address field, the second service comprising a second address segment, the second address segment corresponding to the terminating portion of the service address field;

determine a predetermined terminating value;

compare the predetermined terminating value stored in a register to the first address segment to determine a first Boolean value;

responsive to said determining that the first Boolean value equals 'True', process the first packet to support the first service;

configuring configure a filter arrangement to process the first address segment by:

receiving an identification of at least two clusters comprising the first address segment of the first packet; and selecting at least two of a plurality of fixed length filters to filter the at least two clusters;

compare the predetermined terminating value stored in the register to the second address segment to determine a second Boolean value; and responsive to said determining that the second Boolean value equals 'True', process the second packet to support the second service.

\* \* \* \* \*